(12) United States Patent
Barrera et al.

(10) Patent No.: US 12,311,848 B2
(45) Date of Patent: May 27, 2025

(54) NESTING TWO-STEP SNAP CONNECTION FOR SERVICEABLE COMPONENTS

(71) Applicant: GM GLOBAL TECHNOLOGY OPERATIONS LLC, Detroit, MI (US)

(72) Inventors: Alejandro Barrera, Metepec (MX); Jose Roberto Cabrera, Toluca (MX); Juan Escobar, Toluca (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 452 days.

(21) Appl. No.: 17/728,187

(22) Filed: Apr. 25, 2022

(65) Prior Publication Data

US 2023/0339413 A1    Oct. 26, 2023

(51) Int. Cl.
*B60R 13/02* (2006.01)
*F16B 5/06* (2006.01)

(52) U.S. Cl.
CPC ...... *B60R 13/0206* (2013.01); *B60R 13/0243* (2013.01); *F16B 5/0664* (2013.01)

(58) Field of Classification Search
CPC ............. B60R 13/0206; B60R 13/0243; F16B 5/0664; F16B 5/00
See application file for complete search history.

(56) References Cited

U.S. PATENT DOCUMENTS 8,615,962 B1 * 12/2013 Perez .................. B60R 13/0206
52/716.5

FOREIGN PATENT DOCUMENTS

KR    1020170047967 A * 5/2017

OTHER PUBLICATIONS

KR-1020170047967-A computer translation (Year: 2017).*

* cited by examiner

*Primary Examiner* — Joseph D. Pape
(74) *Attorney, Agent, or Firm* — CANTOR COLBURN LLP

(57) ABSTRACT

A trim assembly of a vehicle includes a first component, a second component, and an attachment element attaching the first component to the second component. The attachment element includes a main body extending from the first component at a first main body end of the main body. The main body includes main body arms extending from the main body at a second body end of the main body. One or more secondary bodies are located at a lateral side of the main body and spaced apart from the main body. A secondary body of the one or more secondary bodies includes a tip protrusion located at a secondary tip end of the secondary body. The attachment element is installable to an attachment opening in the first component to secure the first component to the second component.

18 Claims, 3 Drawing Sheets

NESTING TWO-STEP SNAP CONNECTION FOR SERVICEABLE COMPONENTS

INTRODUCTION

The subject disclosure relates to installation and removal of serviceable components, such as decorative door trim components of a vehicle.

Vehicle interiors, such as doors, have trim pieces installed onto body panels in order to improve, for example, appearance and or functionality of the door interior. The trim pieces, in particular, the door trim pieces are typically installed using a combination of screws and melted studs as primary retention to prevent the trim piece from releasing into the passenger cabin of the vehicle.

Such attachments, however, have limited capabilities to allow for serviceability or part replacement in the case of customization or damage to the trim piece, which requires a complete door trim assembly to be uninstalled to replace the door trim pieces.

SUMMARY

In one embodiment, a trim assembly of a vehicle includes a first component, a second component, and an attachment element attaching the first component to the second component. The attachment element includes a main body extending from the first component at a first main body end of the main body. The main body includes main body arms extending from the main body at second main body end of the main body. One or more secondary bodies are located at a lateral side of the main body and spaced apart from the main body. A secondary body of the one or more secondary bodies includes a tip protrusion located at a secondary tip end of the secondary body. The attachment element is installable to an attachment opening in the first component to secure the first component to the second component.

Additionally or alternatively, in this or other embodiments the tip protrusion engages an edge of the attachment opening to secure the first component to the second component.

Additionally or alternatively, in this or other embodiments the attachment opening includes an attachment opening lip. The tip protrusion engages the attachment opening lip.

Additionally or alternatively, in this or other embodiments the main body has a main body length extending from the first component, and the one or more secondary bodies have a secondary body length extending from the first component shorter than the main body length.

Additionally or alternatively, in this or other embodiments the attachment opening is keyhole shaped having a laterally narrow portion having a first lateral width, and a laterally wide portion having a second lateral width greater than the first lateral width.

Additionally or alternatively, in this or other embodiments the tip protrusion engages an edge of the attachment opening at the laterally narrow portion to secure the first component to the second component.

Additionally or alternatively, in this or other embodiments the attachment opening includes an attachment opening lip. The tip protrusion engages the attachment opening lip.

Additionally or alternatively, in this or other embodiments the first component is removed from the second component by passing the main body arms through the laterally wide portion of the attachment opening.

In another embodiment, a door assembly of a vehicle includes a door inner panel and a door trim assembly installed to the door inner panel. The door trim assembly includes a first door trim component, a second door trim component, and an attachment element attaching the first trim component to the second trim component. The attachment element includes a main body extending from the first trim component at a first main body end of the main body. The main body includes main body arms extending from the main body at a second main body end of the main body. One or more secondary bodies are located at a lateral side of the main body and spaced apart from the main body. A secondary body of the one or more secondary bodies includes a tip protrusion disposed at a secondary tip end of the secondary body. The attachment element is installable to an attachment opening in the second trim component to secure the first trim component to the second trim component.

Additionally or alternatively, in this or other embodiments the tip protrusion engages an edge of the attachment opening to secure the first door trim component to the second door trim component.

Additionally or alternatively, in this or other embodiments the attachment opening includes an attachment opening lip. The tip protrusion engages the attachment opening lip.

Additionally or alternatively, in this or other embodiments the main body has a main body length extending from the first door trim component, and the one or more secondary bodies have a secondary body length extending from the first door trim component shorter than the main body length.

Additionally or alternatively, in this or other embodiments the attachment opening is keyhole shaped having a laterally narrow portion having a first lateral width, and a laterally wide portion having a second lateral width greater than the first lateral width.

Additionally or alternatively, in this or other embodiments the tip protrusion engages an edge of the attachment opening at the laterally narrow portion to secure the first trim component to the second trim component.

Additionally or alternatively, in this or other embodiments the attachment opening includes an attachment opening lip. The tip protrusion engages the attachment opening lip.

Additionally or alternatively, in this or other embodiments the first trim component is removed from the second trim component by passing the main body arms through the laterally wide portion of the attachment opening.

In yet another embodiment, a method of removing a first trim component from a second trim component includes disengaging a secondary body of an attachment element of the first trim component from an attachment opening in the second trim component, moving the attachment element along the attachment opening from a laterally narrow portion of the attachment opening to a laterally wide portion of the attachment opening, and passing a main body of the attachment element through the attachment opening at the laterally wide portion.

Additionally or alternatively, in this or other embodiments the secondary body is disengaged from the attachment opening via flexing of the secondary body.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
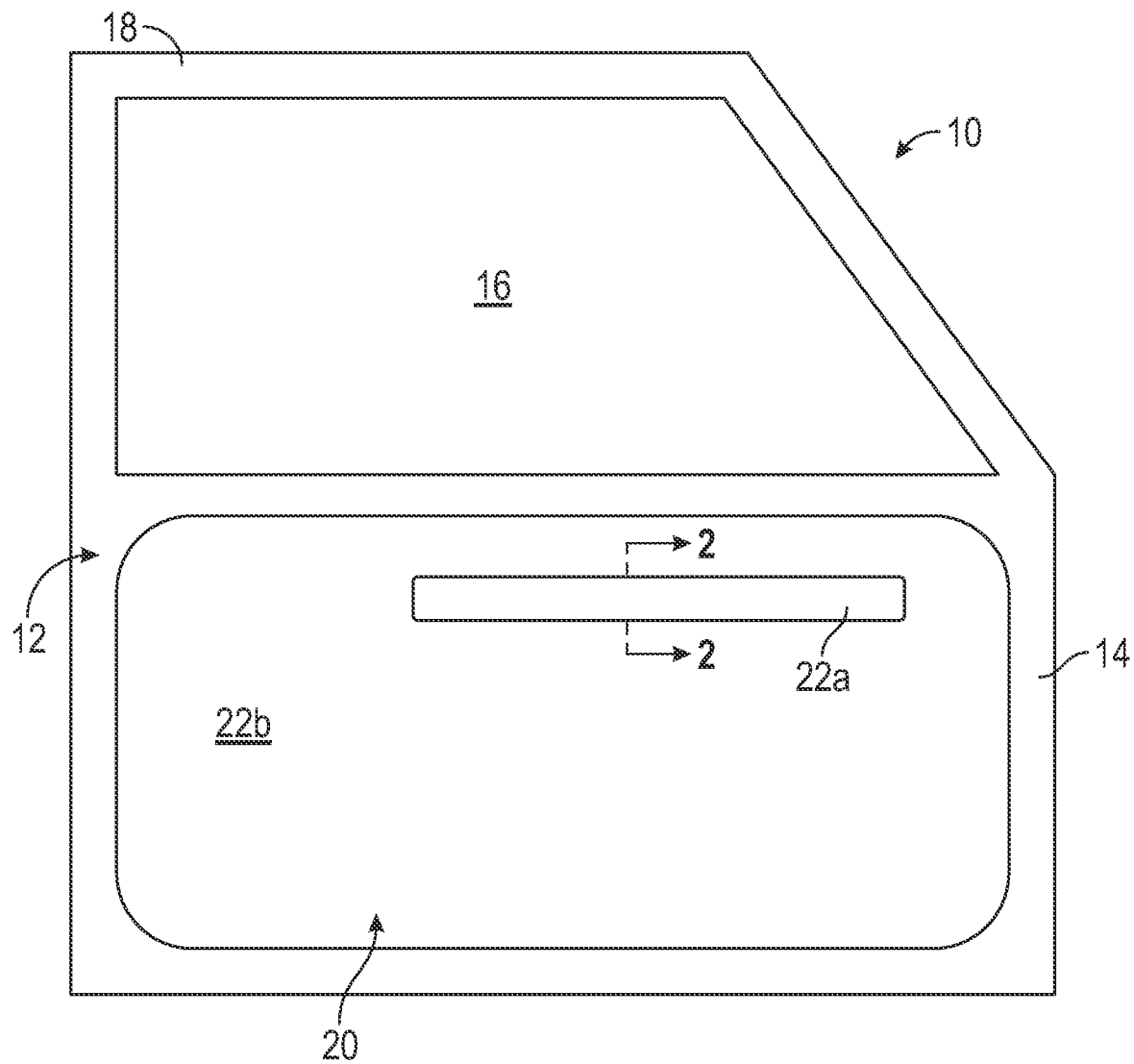
FIG. 1 is a sectional view of an embodiment of a door assembly.

The following description is merely exemplary in nature and is not intended to limit the present disclosure, its application or uses. It should be understood that throughout the drawings, corresponding reference numerals indicate like or corresponding parts and features In accordance with an exemplary embodiment, illustrated in FIG. 1 is an embodiment of a door assembly 10 of a vehicle. The door assembly 10 includes a door 12 having a door inner panel 14, and in some embodiments at least partially defining a window opening 16 via a door sash 18. In some embodiments, the door inner panel 14 is formed from, for example, stamped metal or composite material, and the door sash 18 is similarly formed from a metal or composite material. A door trim assembly 20 is attached to the door inner panel 14, and includes one or more trim pieces 22a and 22b (referred to generally as 22) attached directly to the door inner panel 14 and/or attached to other trim pieces 22. The door trim pieces 22 may be formed from, for example, one or more of plastic, fabric, wood, or metal materials.

Figure 2:
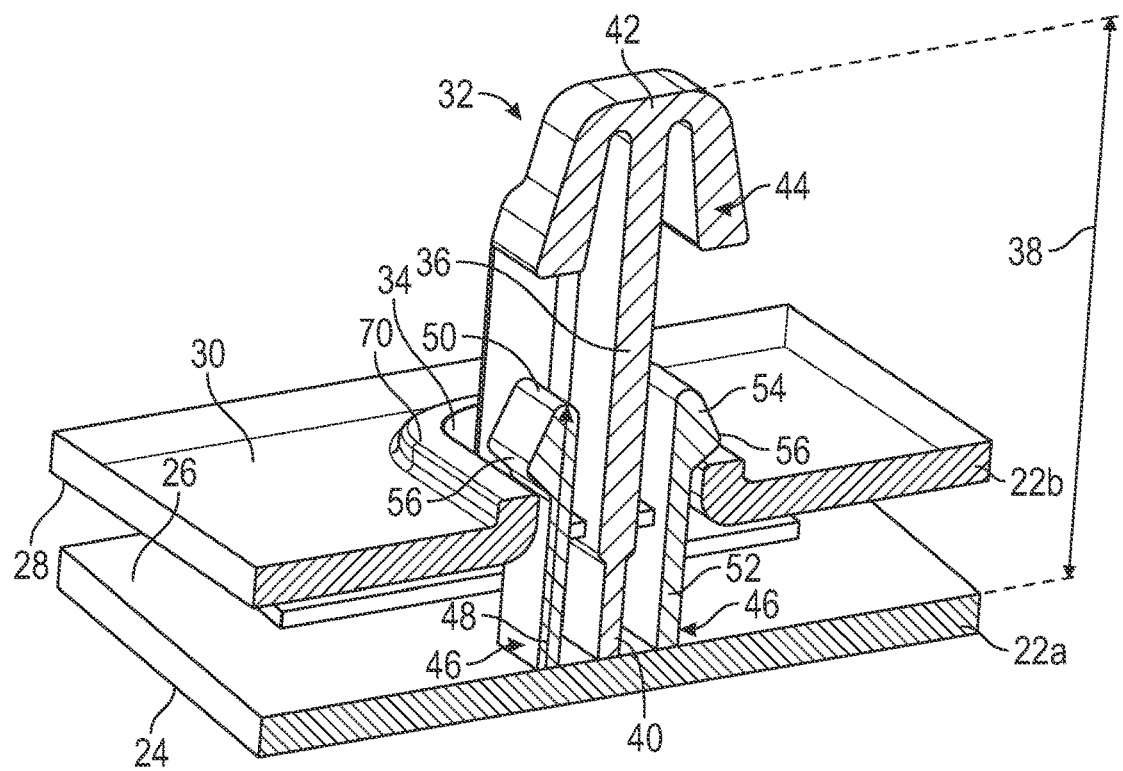
FIG. 2 is a sectional view of an embodiment of an attachment.

Referring to FIG. 2, illustrated is an attachment of a first door trim piece 22a to a second door trim piece 22b. The first door trim piece 22a includes a first front surface 24 and a first back surface 26 opposite the first front surface 24. The second door trim piece 22b similarly includes a second front surface 28 and a second back surface 30 opposite the second front surface 28. When assembled, the first back surface 26 of the first door trim piece 22a abuts the second front surface 28 of the second door trim piece 22b. The first door trim piece 22a is retained to the second door trim piece 22b by one or more attachments 32. The attachments 32 each extend from the first back surface 26 of the first door trim piece 22a and extend through an attachment opening 34 in the second door trim piece 22b when the first door trim piece 22a is installed to the second door trim piece 22b. In some embodiments, the attachments 32 are formed integral to the first door trim piece 22a.

The attachment 32 is a dual snap configuration, as will be described in more detail herein. The attachment 32 includes a main body 36 extending from the first back surface 26 and having a main body length 38. The main body 36 has a first body end 40 at the first back surface 26 and a second body end 42 opposite the first body end 40. The main body 36 has main body arms 44 extending from the second body end 42. The main body arms 44 extend laterally outwardly from the second body end 42 and toward the first body end 40. As shown, in some embodiments two main body arms 44 are located at laterally opposing sides of the main body 36.

The attachment 32 includes secondary bodies 46 located on opposing lateral sides of the main body 36 and spaced apart from the main body 36. The secondary bodies 46 extend from the first back surface 26, in some embodiments parallel to the main body 36. The secondary bodies 46 each have a secondary body length 48 defined between the first back surface 26 and a secondary body end 50. The secondary body length 48 is shorter than the main body length 38. The secondary bodies 46 each include a body portion 52 and a tip portion 54 located at the secondary body end 50. The tip portion 54 includes a tip protrusion 56 extending laterally outwardly from the secondary body end 50.

Figure 3:
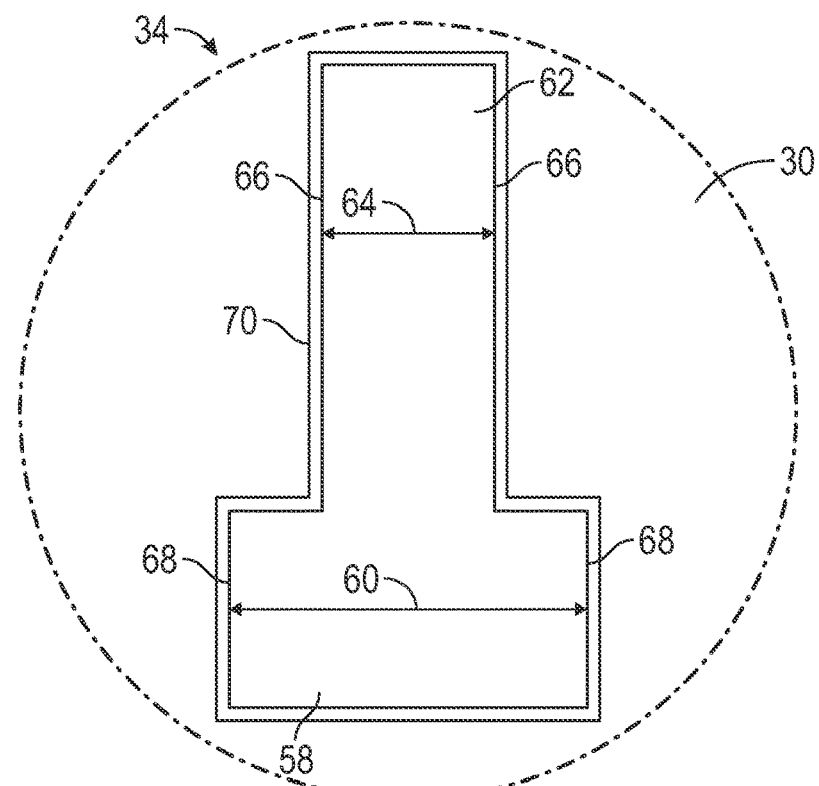
FIG. 3 is an illustration of an embodiment of an attachment opening.

Referring now to FIG. 3, the attachment opening 34 is keyhole-shaped, and has a laterally wide portion 58 having a first lateral width 60 and a laterally narrow portion 62 having a second lateral width 64 less than the first lateral width 60. In some embodiments, the laterally wide portion 58 is defined by parallel opposing first sides 68, and the laterally narrow portion 62 is defined by parallel opposing second sides 66. It is to be appreciated, however, that different configurations of the keyhole shape may be utilized. In some embodiments, an opening lip 70 extends around the attachment opening 34 at the second back surface 30. The opening lip 70 enhances engagement of the attachment 32 in the attachment opening 34.

Figure 4:
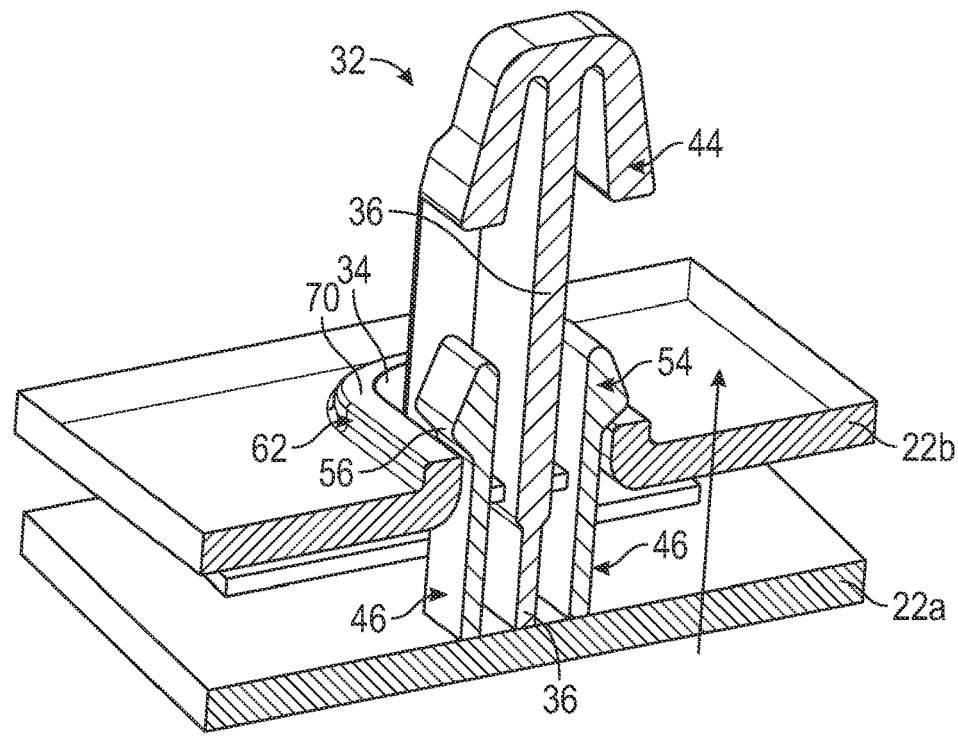
FIG. 4. is an illustration of installation of an attachment in an attachment opening.

Referring now to FIG. 4, the attachment 32 is installed into the attachment opening 34 directly through the laterally narrow portion 62. As the main body 36 has a greater length than the secondary bodies 46, the main body 36 enters the attachment opening 34 first, before the secondary bodies 46. The main body arms 44 pass through the attachment opening 34, and then the tip portions 54 of the secondary bodies 46 pass through the attachment opening 34 such that the tip protrusions 56 engage with the opening lip 70 of the attachment opening 34. The tip protrusion 56 engagement with the opening lip 70 retains the first door trim piece 22a to the second door trim piece 22b, and ensures good fit of the first door trim piece 22a to the second door trim piece 22b. In certain operating conditions, such as an impact condition, the tip protrusions 56 release from the opening lip 70. The main body arms 44 interfere with the opening lip 70 of the attachment opening 34, however, thus preventing full release of the first door trim piece 22a from the second door trim piece 22b.

Figure 5:
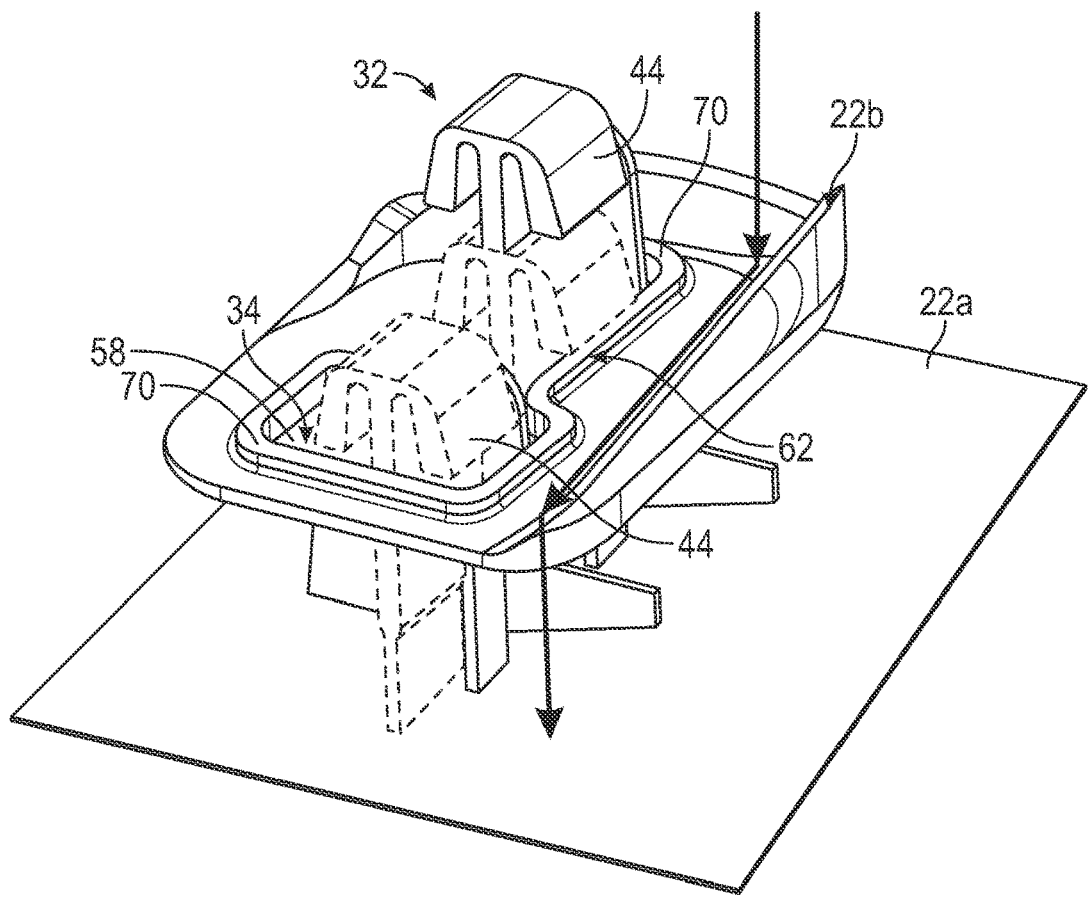
FIG. 5 is an illustration of a removal of an attachment from an attachment opening.

The configuration of the attachment 32 and the attachment opening 34 allow for removal of the first door trim piece 22a from the second door trim piece 22b easily, without damaging either of the door trim pieces 22a, 22b. Removal of the attachment 32 from the attachment opening 34 is schematically illustrated in FIG. 5. To detach the attachment 32 from the attachment opening 34, one or more of the secondary bodies 46 are flexed toward the main body 36, thus releasing the tip protrusions 56 from the opening lip 70. As illustrated by the arrows in FIG. 5, the attachment 32 is then moved to the laterally wide portion 58 of the attachment opening 34. The laterally wide portion 58 is wider than the main body arms 44, so the attachment arms 44 are passed through the attachment opening 34 at the laterally wide portion 58 as shown, thus releasing the attachment 32 from the attachment opening 34, and thereby releasing the first door trim piece 22a from the second door trim piece 22b. This allows for removal of the first door trim piece 22a for repair and/or replacement.

The attachment 32 configurations disclosed herein allow for retention of the first door trim piece 22a, while also allowing the first door trim piece 22a to be easily removed without utilizing special tools or damaging the first door trim piece 22a. This reduces service cost and time needed to perform service.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A trim assembly of a vehicle, comprising:
a first component;
a second component; and
an attachment element attaching the first component to the second component, the attachment element including:
a main body extending from the first component at a first body end of the main body, the main body including main body arms extending in opposing directions from the main body at a second body end of the main body; and
two secondary bodies disposed at opposing lateral sides of the main body and spaced apart from the main body, each a secondary body including a tip protrusion disposed at a secondary tip end of the secondary body for engagement with the second component;
wherein the attachment element is installable to an attachment opening in the first component to secure the first component to the second component.

2. The trim assembly of claim 1, wherein the tip protrusion engages an edge of the attachment opening to secure the first component to the second component.

3. The trim assembly of claim 2, wherein the attachment opening includes an attachment opening lip, the tip protrusion engaging the attachment opening lip.

4. The trim assembly of claim 1, wherein:
the main body has a main body length extending from the first component; and
the two secondary bodies have a secondary body length extending from the first component shorter than the main body length.

5. The trim assembly of claim 1, wherein the attachment opening is keyhole shaped having:
a laterally narrow portion having a first lateral width; and
a laterally wide portion having a second lateral width greater than the first lateral width.

6. The trim assembly of claim 5, wherein the tip protrusion engages an edge of the attachment opening at the laterally narrow portion to secure the first component to the second component.

7. The trim assembly of claim 6, wherein the attachment opening includes an attachment opening lip, the tip protrusion engaging the attachment opening lip.

8. The trim assembly of claim 5, wherein the first component is removed from the second component by passing the main body arms through the laterally wide portion of the attachment opening.

9. A door assembly of a vehicle comprising:
a door inner panel; and
a door trim assembly installed to the door inner panel, the door trim assembly including:
a first trim component;
a second trim component; and
an attachment element attaching the first trim component to the second trim component, the attachment element including:
a main body extending from the first trim component at a first body end of the main body, the main body including main body arms extending in opposing directions from the main body at a second body end of the main body; and
two secondary bodies disposed at opposing lateral sides of the main body and spaced apart from the main body, each secondary body including a tip protrusion disposed at a secondary tip end of the secondary body for engagement with the second trim component;
wherein the attachment element is installable to an attachment opening in the second trim component to secure the first trim component to the second trim component.

10. The door assembly of claim 9, wherein the tip protrusion engages an edge of the attachment opening to secure the first trim component to the second trim component.

11. The door assembly of claim 10, wherein the attachment opening includes an attachment opening lip, the tip protrusion engaging the attachment opening lip.

12. The door assembly of claim 9, wherein:
the main body has a main body length extending from the first trim component; and
the two secondary bodies have a secondary body length extending from the first trim component shorter than the main body length.

13. The door assembly of claim 9, wherein the attachment opening is keyhole shaped having:
a laterally narrow portion having a first lateral width; and
a laterally wide portion having a second lateral width greater than the first lateral width.

14. The door assembly of claim 13, wherein the tip protrusion engages an edge of the attachment opening at the laterally narrow portion to secure the first trim component to the second trim component.

15. The door assembly of claim 14, wherein the attachment opening includes an attachment opening lip, the tip protrusion engaging the attachment opening lip.

16. The door assembly of claim 13, wherein the first trim component is removed from the second trim component by passing the main body arms through the laterally wide portion of the attachment opening.

17. A method of removing a first trim component from a second trim component, comprising:
disengaging two secondary bodies of an attachment element of the first trim component from an attachment opening in the second trim component;
moving the attachment element along the attachment opening from a laterally narrow portion of the attachment opening to a laterally wide portion of the attachment opening; and
passing a main body of the attachment element through the attachment opening at the laterally wide portion;
wherein the main body extends from the first trim component at a first body end of the main body and includes main body arms extending in opposing directions from the main body at a second body end of the main body; and
wherein the two secondary bodies are disposed at lateral sides of the main body and are spaced apart from the main body, each secondary body including a tip protrusion disposed at a secondary tip end of the secondary body for engagement with the second trim component.

18. The method of claim 17, further comprising disengaging the two secondary bodies from the attachment opening via flexing of the two secondary bodies.

* * * * *